(12) United States Patent
Bretschneider et al.

(10) Patent No.: US 6,828,026 B2
(45) Date of Patent: Dec. 7, 2004

(54) HOLLOW BALLS AND A METHOD FOR PRODUCING HOLLOW BALLS AND FOR PRODUCING LIGHT-WEIGHT STRUCTURAL COMPONENTS BY MEANS OF HOLLOW BALLS

(75) Inventors: Frank Bretschneider, Liegau-Augustusbad (DE); Herbert Stephan, Dresden (DE); Juergen Brueckner, Dresden (DE); Guenter Stephani, Grosserkmannsdorf (DE); Lothar Schneider, Coswig (DE); Ulf Waag, Dresden (DE); Olaf Andersen, Dresden (DE); Paul Hunkemoeller, Coesfelg (DE)

(73) Assignees: Glatt Systemtechnik Dresden GmbH, Dresden (DE); Fraunhofer-Gesellschaft Zur Foerderung der Angewandten Forschung E.V., Munich (DE)

( * ) Notice: Subject to any disclaimer, the term of this patent is extended or adjusted under 35 U.S.C. 154(b) by 3 days.

(21) Appl. No.: 10/169,752
(22) PCT Filed: Jan. 24, 2001
(86) PCT No.: PCT/DE01/00349
§ 371 (c)(1),
(2), (4) Date: Oct. 9, 2002
(87) PCT Pub. No.: WO01/54846
PCT Pub. Date: Aug. 2, 2001

(65) Prior Publication Data
US 2003/0104147 A1 Jun. 5, 2003

(30) Foreign Application Priority Data

Jan. 25, 2000 (DE) .......................... 100 03 175
Mar. 10, 2000 (DE) .......................... 100 11 764
Mar. 10, 2000 (DE) .......................... 100 11 856
Sep. 7, 2000 (DE) .......................... 100 46 174

(51) Int. Cl.⁷ .............................................. B32B 9/00
(52) U.S. Cl. ...................... 428/404; 428/403; 428/407; 428/469; 428/701

(58) Field of Search ............................... 428/404, 406, 428/407, 432, 433, 469, 699, 543; 427/585, 129, 181, 227, 250, 287, 375, 376.1, 376.2, 376.3, 376.6, 376.7, 376.8

(56) References Cited

U.S. PATENT DOCUMENTS

| | | | | |
|---|---|---|---|---|
| 2,797,201 A | * | 6/1957 | Veatch et al. ................. | 521/57 |
| 3,773,475 A | | 11/1973 | Madden, Jr. | |
| 4,218,507 A | * | 8/1980 | Deffeyes et al. ............. | 428/328 |
| 4,775,598 A | * | 10/1988 | Jaeckel ....................... | 428/550 |

(List continued on next page.)

FOREIGN PATENT DOCUMENTS

| | | |
|---|---|---|
| AT | 144356 | 1/1936 |
| DE | 2737248 | 3/1979 |
| DE | 3724156 | 2/1989 |
| DE | 3902032 | 7/1990 |
| DE | 19750042 | 12/1998 |
| DE | 19817959 | 7/1999 |
| EP | 0271944 | 6/1988 |
| EP | 0300543 | 1/1989 |
| JP | 1215432 | 8/1989 |

*Primary Examiner*—Deborah Jones
*Assistant Examiner*—A B. Sperty
(74) *Attorney, Agent, or Firm*—Jacobson Holman PLLC

(57) ABSTRACT

The invention relates to hollow balls having shells comprising a sintered inorganic material, such as metals, metal oxides or ceramic, and to methods for producing lightweight structural components using such hollow balls. According to the object of the invention, the application area is to be widened, processing to form structural components is to be made technologically simpler and the properties of the hollow balls and of the structural components produced therewith are to be improved for specific applications. For this purpose, an additional solid functional layer is formed on a shell on the hollow balls. The functional-layer material can then be made able to flow and plastically and/or elastically deformed as a result of a physical and/or chemical treatment.

28 Claims, 1 Drawing Sheet

U.S. PATENT DOCUMENTS

Figure 1:
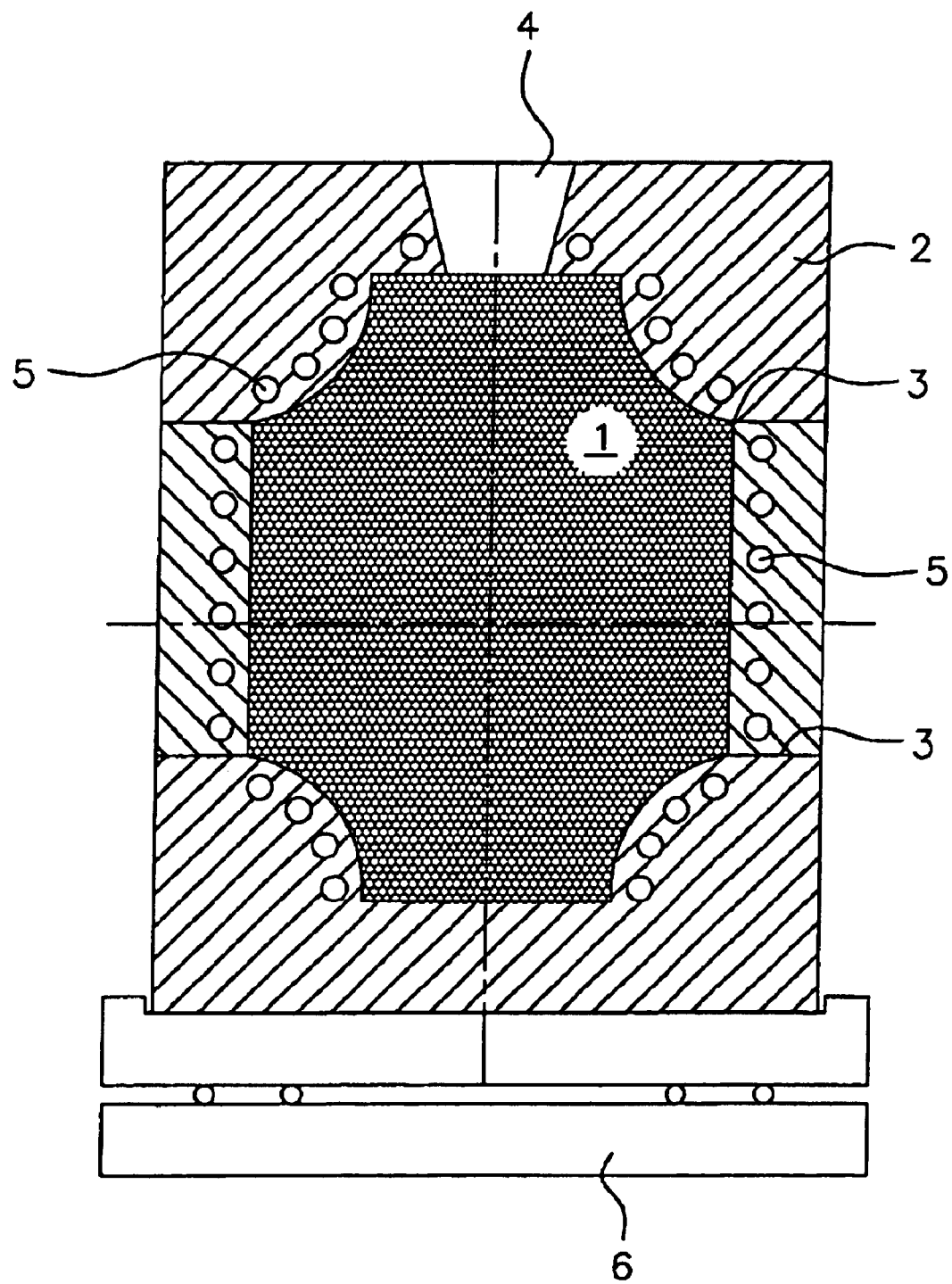

| | | |
|---|---|---|
| 4,917,857 A | 4/1990 | Jaeckel et al. |
| 4,925,740 A | 5/1990 | Norris et al. |
| 5,372,849 A * | 12/1994 | McCormick et al. ....... 427/253 |
| 5,667,917 A * | 9/1997 | Edwards et al. ............ 429/228 |
| 5,786,785 A * | 7/1998 | Gindrup et al. ................. 342/1 |
| 6,037,019 A * | 3/2000 | Kooyer et al. .............. 427/598 |
| 6,228,933 B1 * | 5/2001 | Hiles .......................... 524/590 |
| 6,501,784 B1 * | 12/2002 | Boehm et al. .............. 373/137 |

* cited by examiner

HOLLOW BALLS AND A METHOD FOR PRODUCING HOLLOW BALLS AND FOR PRODUCING LIGHT-WEIGHT STRUCTURAL COMPONENTS BY MEANS OF HOLLOW BALLS

This is a nationalization of PCT/DE01/00349 filed Jan. 24, 2001 and published in German.

The invention relates to hollow balls having shells comprising a sintered inorganic material, such as metals, metal oxides or ceramics, and to methods for producing the hollow balls of lightweight structural components using such hollow balls.

EP 0 300 543 A1 and U.S. Pat. No. 4,917,857 have described a method for producing metallic and ceramic hollow balls. In this case, an aqueous suspension of a metallic or ceramic powder with an organic binder is applied to a ball-shaped core of a foamed polymer, and the polymer which forms the core is pyrolyzed during a heat treatment (400 to 500° C.), during which treatment the gaseous components escape and what is referred to as a green body of sufficient stability is obtained.

This green body is then heated further, in order also to expel the organic constituents of the binder which have hitherto remained in place and to sinter the powder particles together to form a closed ball shell.

Furthermore, DE 197 50 042 C2 has described in particular the application of the pulverulent starting material together with a liquid binder to a core by using a rotor to roll it around.

The hollow balls with a shell which are obtained in this way and substantially comprise the powder material can be used for various applications.

One such application is described in DE 198 17 959 C1 for lightweight structural components. According to this document, such hollow balls, which are known per se, are to be mixed with a polymer adhesive to form a "slurry of balls", and this "slurry of balls" is to be introduced into a mold or between two surface plates before the adhesive is cured. A certain limited time window in which the suitably pretreated balls have to be processed is available for this purpose before the adhesive cures.

Moreover, when mold bodies with difficult geometries, for example those with undercuts, are being filled, there are problems with completely filling the entire volume of the mold body with a "slurry of balls" of this type.

After the adhesive (polyurethane or polyester based, an epoxy adhesive or PMMA) has cured, the adhesive forms a solid bond for the hollow balls forming a lightweight structural component of this type, but on the one hand this is not always completely successful on account of the possibility of segregation and on the other hand for some applications this is also undesirable.

However, if the hollow balls are introduced into a mold body first and then the more or less viscous adhesive is introduced, it is impossible to achieve a homogenous distribution of adhesive in the mold body.

Therefore, it is an object of the invention to improve hollow balls having shells of sintered inorganic material in such a way that their range of application is widened, processing to form structural components is technologically simplified and the properties of the hollow balls and of the structural components produced therewith are improved for specific applications.

The hollow balls according to the invention are based on conventional solutions but have at least one additional functional layer on the spherical shell, which consists of a sintered, at least predominantly inorganic material. The functional-layer material, components contained therein or components which are applied to a functional layer can be made able to flow, plastically and/or elastically deformed by means of a physical and/or chemical treatment. As a result, the shells and consequently also adjacent hollow balls can be fixed to one another in an adhesive and/or positively-locking manner.

The shells may consist of metal, a metal alloy, a metal oxide or a ceramic. They may be as far as possible free of organic constituents. Examples of suitable metals are iron, nickel, copper and light metal, e.g. titanium, aluminum or high-melting heavy metals, such as for example tungsten or molybdenum and alloys thereof.

The physical and/or chemical treatment and the selection of materials should preferably be such that at least the shells of the hollow balls do not become unstable during the treatment.

It is also possible for a plurality of functional layers to be formed above one another in the manner of an onion skin, in which case the corresponding choice of materials may cover various applications. In this case, the treatment of such hollow balls may also be carried out in a plurality of steps specific to the particular application.

A hollow ball according to the invention with an additional solid functional layer which has been additionally applied, for example by application of a suspension to the shell, and dried or cured, represents an initial product which can be processed better and more easily than the conventional hollow balls, and these hollow balls save the final manufacturer of structural components a number of technological process steps.

It is possible to use hollow balls without a functional layer with an external diameter of 0.1 to 20 mm, preferably 0.5 to 5 mm. In this case, the shell may have a thickness which corresponds to 0.1 to 50%, preferably up to 10%, of the external diameter of the hollow balls.

The functional layer(s) according to the invention should have a thickness which, after the physical and/or chemical treatment of the hollow balls, ensures the appropriate functional effect, for example protection against corrosion or an adhesive bond between adjacent hollow balls. However, the thickness should advantageously be selected to be at least sufficiently great for it to be possible to achieve positively locking fixing of adjacent hollow balls during the plastic and/or elastic deformation.

It is generally sufficient for the thickness of a functional layer to be less than the thickness of the shell. The thickness of a functional layer should be no greater than 0.9 times, preferably 0.1 times to 0.5 times, the thickness of the shell of the corresponding hollow ball. This allows functions, such as for example the joining of adjacent hollow balls to form a lightweight structural component, protection against corrosion for the metal shells, electrical and magnetic properties, to be achieved.

Moreover, the mass of at least one functional layer or a plurality of these layers should not exceed the mass of the shell.

For positively locking fixing of adjacent hollow balls by means of the functional-layer material, it may be sufficient for at most 80% of the surface of the shell to be covered.

This allows the mass of a lightweight structural component produced from hollow balls to be reduced.

The hollow balls according to the invention should be able to flow freely and should not stick to one another, so that they can be processed without problems after storage and transport.

An additional sealing layer may be applied to the functional layer, in particular to provide temporary protection during transport and storage, so as to form very smooth, non-adhesive surfaces. By way of example, quick-drying, preferably water-soluble coatings or other more or less viscous liquids can be sprayed on. Suitable examples are cellulose or pectin solutions or polyvinyl alcohol.

The functional layers may be formed from a homogenous material but may also be formed from composites.

For example, for certain applications (e.g. for detection purposes), ferromagnetic and/or permanent-magnet particles may be embedded in the functional layer.

However, the functional layer may also be doped or formed with catalytically active elements or compounds. By way of example, platinum and/or Rhodium may be electro-deposited on a shell or a functional layer without the use of external current.

If organic materials or components are used for the functional layers, polymers which are selected from the group consisting of ethylene vinyl acetate copolymers (EVA), polyamides or polyesters, but also phenolic resin, cresol resin, furan resin or epoxy resin and/or binder based on latex or rubber, are particularly suitable. By way of example, a suitable epoxy resin is known under the trade name Terokal 5051 LV, and a rubber-based material is commercially available under the trade name Terostat 5190. Both products can be applied at temperatures of over 55° C. and can then be cured by the introduction of energy. They then have a high strength and high rigidity. The rubber-based material may also be partially vulcanized. Both the above-mentioned products have an electrical conductivity of approx. $10^6$ Ωcm.

The substances known as "hot melts", which are often ethylene vinyl acetate copolymers, are particularly suitable.

The composition of these materials can be set in such a way that they can be applied at relatively low temperatures (e.g. <60° C.) in the liquid phase and subsequently, after drying, can be activated, for example by means of heating. In this case, a specific softening or melting point, which should preferably be above 80° C., particularly preferably above 100° C., can be set very deliberately by means of a specific selection or composition.

However, it is also possible to use powder coatings which are known per se, for example based on phenolic or epoxy resin, as functional-layer material. These coatings may be applied in powder form to the heated hollow balls, for example in a fluidized bed; temperatures at which the powder adheres to the shells of the hollow balls but at which the powder coating powder does not melt leading to running should be maintained. The individual powder particles can adhere with a more or less uniform distribution to the shell surface and, after cooling, the hollow balls can readily be transported and stored without sticking to one another. The temperature is only increased again, until the powder softens or melts, during the production of lightweight structural components. During the melting, a uniform coating coverage can be formed over the entire surface, but in this case, given a suitable densely packed arrangement of the hollow balls or the application of a pressure (compacting) to the hollow balls, surface regions of hollow balls which are in direct contact with one another can be kept free of functional-layer material (e.g. free of coating).

A functional layer may, for example, be formed from an organic or inorganic binder, in and/or on which particles, preferably metals or polymers, are held adhesively. These particles can be deformed during a final thermal processing.

Polymers may also contain pulverulent inorganic elements and compounds and may then in particular fulfill binder functions for the elements or compounds, in addition to other functions, such as corrosion prevention and/or insulation.

Examples of suitable inorganic elements or compounds are metals, colored pigments, metal compounds, metal alloys and/or those which have magnetic or ferromagnetic properties.

If pulverulent elements or compounds are used for the functional layers, they can be applied to the shells as a suspension with a binder. In addition to organic binders, it is also possible to use inorganic binders. By way of example, metal salt solutions or water glass can be used to at least temporarily bind metal, metal oxide, ceramic or glass powder. Examples of suitable glasses are enamels or soldering glasses, for example lead- or boron-containing glasses, the latter having a relatively low softening and melting point.

The functional layer may advantageously consist of a metal or contain a metal which is able to form an intermetallic compound with a metallic shell material or a second functional-layer material. This is possible, for example, with tin and copper. Various aluminides may also be formed in this way.

However, it is also possible to form metal alloys if suitable metals are included in a functional layer or in functional layer and shell.

Particularly in the case of porous shells, it may be advantageous to select a combination of materials which allows infiltration. In this case, the functional-layer material can be infiltrated into the porous shell, or shell material can be infiltrated into the functional layer, in order to obtain a continuous covering. This allows the external diameter of the hollow balls to be influenced.

Moreover, porous ceramics or metals which are difficult to sinter can be provided with a dense surface.

It is also possible fore the functional layer to contain various additives. Examples are solders, fluxes, sintering aids, blowing agents and swelling agents.

By way of example, the functional layer may be formed from a pulverulent metal or may contain a metal of this type and also a blowing agent. During a heating operation, metal foam which is able to at least partially fill cavities in a bed of hollow balls is formed by means of the functional layer.

It is possible for a very wide range of metal powders of pure metals (e.g. Si, Al or Cu), but also alloys, for example with Mn, to be used.

Suitable blowing agents are metal hydrides, carbonates or hydrates. Pulverulent titanium hydride may preferably be used.

Within the functional layer, the concentration of the blowing agent in the functional layer should be greater in the inner wall than outside, in order to advantageously influence the formation of foam.

Particularly in the case of a plurality of different functional layers which are formed one above the other, a combination of physical and chemical treatments may be appropriate. By way of example, removal or activation may be carried out by means of a chemical route, followed by plastic deformation by means of a heat treatment.

Compared to known solutions, hollow balls according to the invention with a shell which is substantially formed from metal can advantageously be produced by providing a substrate material which is volatile when heated, for example STYROPOR (a proprietary trade name for expandable polystyrene), with a covering layer. This covering layer is formed from a liquid which contains a binder and base-metal powder parts, sintering being carried out after a drying operation. In conventional methods, problems occur because ball-shaped semifinished products which have been prepared in this way do not have sufficient strength during the sintering, since, as the temperatures rise, the binder action generally drops considerably. The binder used is expelled by evaporation or pyrolysis, so that the strength is reduced. The sintered wall thickness which have formed can be damaged and depressed even at low pressures and forces, so that individual hollow balls which have been prepared in this way are destroyed. It is difficult to get rid of these damaged or destroyed hollow balls. This drawback can be combated by adding an additive which decomposes when heated to the mixture which contains the binder and the base-metal powder. An additive of this type may be dissolved in the liquid of the mixture or may be present in colloidal form.

The decomposition of the additive may take place during the sintering, in which case the supplementary decomposition products which are formed from the additive form additional binder constituents for the base-metal powder, in the form of solid bodies, during the period of the heat treatment involved in the sintering. This process runs in the opposite direction to the reduced binder action of the actual binder as the temperature rises, and the binder function is gradually taken over by the supplementary decomposition products formed from the additive.

The hollow ball with a metallic shell which is present after the sintering can then subsequently be provided with at least one functional layer, as has already been described in various exemplary forms.

The additive, which is present in the form of a suspension together with the liquid, the binder and the base-metal powder, may advantageously be a metal salt or a metal hydroxide; it is also possible for a plurality of such salts and/or metal hydroxides to be present. As a result of the temperature being increased over the course of the heat treatment involved in the sintering, a metal oxide is formed from a metal salt (the oxide formation may advantageously take place in an oxidizing atmosphere). The metal oxide, which is formed in the form of solid bodies as a supplementary decomposition product, of a metal salt then acts as a binder between the base-metal powder parts and increases the strength of the shell which forms on a hollow ball, while the binder which is substantially composed of organic components is decomposed through pyrolysis.

However, sintering can also be carried out in an inert atmosphere, e.g. nitrogen or argon.

By way of example, copper acetate, nickel acetate, iron oxalate, nickel carbonate, nickel acetylacetonate or copper acetilacetonate are suitable. These compounds should preferably be used dissolved up to their saturation limit in a liquid. During the drying which is carried out prior to the sintering, the dissolved additives are concentrated in the liquid on account of the surface tension thereof at the locations of contact with the base-metal powder parts, and after the drying remain in place as a solid substance together with the organic binder constituents which were present in the liquid and, on account of the increase in volume at the locations of contact with the base-metal powder parts, increase the strength of the shells of the hollow ball so as to protect it against pressure and vibration.

The strength of the hollow balls is also achieved as a result of the supplementary decomposition products, which are formed during the sintering process, remain as solid bodies and have been obtained from the additive, being accumulated in concentrated form in each case at all the contact locations between the base-metal powder parts. This accumulation takes place as a result of the surface tension of the liquid at the contact locations of the individual base-metal powder parts before the drying.

The fact that the binder function is taken over by the decomposition products formed from the additive during heating, while at the same time the binder function of the binder of the base-metal powder parts is reduced in the opposite direction, has a particularly advantageous effect for thin-walled hollow balls.

The additive used may advantageously be metal salts of organic acids, since during decomposition of an additive of this type and of the binder, only carbon, oxygen and/or hydrogen are released and discharged to atmosphere, and substances of this type are generally harmless to people, environment and technology.

The metal salts are advantageously selected from readily reducible metals, such as copper, iron, nickel, cobalt, tin, molybdenum, tungsten and/or silver, and accordingly, in the case of a base-metal powder based on iron, are eminently suitable for sintering, these metals also being suitable alloying elements, since they can also be used for sintered steels.

To produce the suspension from which the covering layer which may subsequently form the protective shell of a hollow ball after the sintering, the solvent used may, for example, be water, alcohol or similar liquids. If, by way of example, alcohol is used as the liquid, this alcohol is particularly advantageously suitable since the generally organic binder is readily soluble in alcohols.

The formation of the covering layer may be applied to the ball-shaped substrate made from STYROPOR (a trade name for expandable polystyrene) or styrene in prefoamed form by means of wet powder-spraying processes or slip casting, the substrate body being completely decomposed by degassing and pyrolysis after the drying and sintering, and the gaseous components which are formed escaping to the outside, so that the metallic shell formed may be completely hollow on the inside.

The organic binder used may be a binder comprising one or more organic binders which is present in the liquid together with the base-metal powder part and the additives.

During the abovementioned accumulation of the additive at the contact points of the base-metal powder parts, the additive in the liquid is dissolved on an atomic and/or molecular size level and/or distributed homogeneously. During the drying, the additive which is present in the liquid forms a solid substance between the contact points of the base-metal powder parts. However, it is not yet decomposed during the drying step. The accumulation of the solid substance formed from the additive at the contact points between the base-metal powder parts is retained after the drying step, and the binding of the base-metal powder parts to one another can be strengthened in this way, so that the strength of the dried covering layer can be increased simply because of the increase in volume which has occurred at the contact points of the base-metal powder parts. The hollow ball, which is substantially formed from the dried covering layer, is already considerably less sensitive to impact, vibrations and jolting, even prior to sintering, than is the case in known solutions.

Metal salts of metals whose oxides can readily be reduced can very particularly advantageously be used. Examples of such metals are copper, iron, nickel, cobalt, tin, molybdenum, tungsten and silver. By way of example, metal salts which are selected from the group consisting of hydroxides, carbonates, acetates, formates, oxalates and/or acetylacetonates may expediently be used for forming shells of hollow balls.

The binder can be removed from the dried hollow ball which is provided with the covering layer during a further heat treatment carried out in a oxidizing atmosphere at temperatures of approx. 600° C. In the process, all the organic binder constituents decompose, as does the additive which has been added, the latter forming a supplementary decomposition product, generally metal oxides and/or metal hydroxides, which is in the form of solid bodies. The additive, which is now in the form of solid bodies, can now assume the role of the organic constituents of the binder, which has lost its molecular structure of the organic binder system predominantly as a result of pyrolysis, and the organic molecules for the most part escape in the form of a gas. The thermodynamic stability of individual organic products which have been subjected to the pyrolysis means that a binder residue often remains, which initially substantially comprises aromatic hydrocarbon compounds and can therefore still perform a binding function between the base-metal powder parts. The reduction in the binder action can be very substantially compensated for by the decomposition products of the binder which have formed, since, by way of example, metal oxides which are formed as decomposition products can act as binders.

During the sintering, as the temperature rises first of all the binder, apart from binder residues, becomes volatile, followed by the substrate material which is used. The decomposition temperatures of the substrate material and of the additive are normally below the melting point of the additive and of the respective base-metal powder parts.

During the sintering, the binding action of metal oxides increases as the temperature rises, in particular on account of their small particle size, whereas the binding action of the binder which has become volatile, apart from a few residual binder residues, decreases in the opposite direction as the sintering time progresses.

In one configuration of the inventive method for producing hollow balls with metallic shells, in the case of sintering in a reducing atmosphere, it is possible for alloying constituents for the base-metal powder parts, which are likewise in solid from as an intermediate product, to be formed the in this case from the supplementary decomposition products of the additive. The melting point of a supplementary product which is formed from the binder should in this case be lower than the melting point of the respective base-metal powder.

As has already been mentioned, after the sintering operation at least one functional layer can be applied to the metallic, stable shell which has now formed, for example in a fluidized-bed reactor.

However, it is also possible for a metal layer to be electro-deposited, without the use of external current, directly on the metallic shell or on an intervening, appropriate functional layer; metals which are suitable for acting as a catalyst may be particularly recommended for this metal layer. In this case, it is advantageous for the surface of the shell or functional layer to be formed with a relatively great roughness or porosity, in order to correspondingly increase the size of the surface area.

However, functional layers can also be applied and formed in the fluidized bed or in an apparatus as described, for example, in DE 197 50 042 C2.

To produce lightweight structural components using hollow balls according to the invention, a mold body or a structure which forms the outer cladding of the lightweight structural component is filled with these hollow balls, which as far as possible fill the entire internal volume.

After the filling operation and optional compacting of the otherwise untreated hollow balls, a physical and/or chemical treatment, in which the functional-layer material is softened at least until it can be plastically and/or elastically deformed, is carried out in at least one further method step.

The compacting can be carried out by simple pressure compacting, but can more advantageously be carried out by means of vibratory compacting, in which case a compacting operation may advantageously also be carried out at least from time to time during the subsequent physical and/or chemical treatment.

The physical treatment may involve heating of the functional-layer material which is brought about by introduction of energy; the softening point and if appropriate also the melting point of this material should be lower than that of the material which forms the shell.

The heated material which is able to flow adapts itself to the surface form of the hollow balls, which are packed together as tightly as possible and are in virtually punctiform contact with one another. After the cooling, during which the functional-layer material can also solidify again, adjacent hollow balls are fixed at least in a positively-locking manner, secure adhesive bonding not being absolutely imperative.

The flow of the functional-layer material allows cavities which have remained between the hollow balls to be at least partially filled with this material. This makes it possible to influence forces acting on the hollow ball and to avoid undesirable stresses in the shells.

Moreover, it is possible to ensure that between the contact points or surfaces of adjacent hollow balls, the functional-layer material is completely displaced and the shells bear directly against one another, so that the stability and strength of the lightweight structural component can be increased.

The heating may be effected, for example, by convection using hot gases or liquids which are guided through the bed of the hollow balls, or by thermal radiation, inductively or via the correspondingly heated mold wall.

A chemical treatment may preferably be carried out using a solvent which is suitable for the functional-layer material and is introduced in liquid or vapor into the filled mold. A solvent of this type is used to soften the functional-layer material, so that this material is once again temporarily plastically deformable. After the solvent has been extracted or evaporated off, which can be achieved by suction and/or heating, the functional-layer material can solidify again and maintain the shape which it has adopted.

In the case of a mixture of a plurality of components from which the functional layer has been formed, it may be sufficient to soften one component using the solvent and/or by supplying energy sufficiently for it to become plastically deformable.

It is possible to use organic solvents in order to at least partially dissolve and soften corresponding polymers or functional layers which contain polymers and/or organic components which are contained therein.

Functional-layer materials whose volume increases as a result of the treatment, for example by foaming, are particularly advantageous. This makes it possible to compensate for diameter tolerances of the shells of the hollow balls and if appropriate also to advantageously influence the properties, in particular the damping and elasticity of the lightweight structural component.

Such materials may be foamable polymers, polymers which contain blowing agents, glasses or metals which contain pulverulent blowing agents.

For example, a metal powder, which may have been bound using an organic binder, may additionally be mixed with a suitable pulverulent blowing agent, so that given suitable heating a metal foam is formed around the shell. Examples of suitable blowing agents are metal hydrides, carbonates or hydrates. By way of example, titanium hydride powder can be used for aluminum.

However, in the case of a chemical treatment it is also possible to add swelling agents in order to increase the volume of the functional-layer material. For example, swellable polymers may be applied to shells as functional-layer material and, after a structure which forms the outer cladding of a lightweight structural component has been filled, an organic or inorganic swelling agent can be added. Following the increase in volume which is produced as a result of swelling, the structure is sealed off in a gas tight manner and the hollow balls-are stabilized by the functional-layer material.

Examples of polymers of this type are those which are known as "superabsorbers". These polymers can be swollen using water or aqueous solutions, resulting in a significant increase in volume. This is maintained for as long as the water is stored in the polymer.

If, by way of example, a lightweight structural component of this type having a gas tight and water tight cladding is used, the swollen polymer can fix the individual hollow balls, if appropriate filling up the cavities.

After the cladding has been opened and the water has been removed by drying, if necessary this assembly can be dissolved again and, if desired, the hollow balls can likewise be removed again.

However, it is also possible for metals, alloys or glasses without blowing agent to be used as supporting-layer material, but at least the softening point and if possible also the melting point should be below those of the shell material. In the case of alloys, at least one significant alloying component should satisfy this requirement.

The heat treatment may in this case be continued until the functional-layer material melts and the hollow balls are soldered together. In this case, it is advantageously also possible for at least one solder and optionally also a suitable flux to be included or embedded in the functional layer. A functional layer of this type may in this case consist, for example, of pure tin or bound tin powder.

An iron shell or a shell which consists of stainless high-strength and heat-resistant steel may, for example, be coated with a copper alloy which forms the functional layer.

Particularly in the case of relatively reactive shell materials, such as for example iron or aluminum, the functional layers advantageously act to prevent oxidation. They also form protection against corrosion in the case of components produced from hollow balls.

If adjacent shells or the functional material is/are to be sintered during the heat treatment, it is also possible for in each case suitable sintering aids to be included or embedded in the functional-layer material.

If adjacent shells are to be sintered together at their contact points, the functional-layer material has to either have been expelled or displaced sufficiently through plastic deformation, and the shell outer walls must be in direct contact with one another when or once the sintering temperature is reached.

It may also be advantageous if the inner wall of the mold body has been coated with a parting agent or the inner wall of the mold body or that the structure which forms the outer cladding of a lightweight structural component has been coated with a material which is also suitable for the functional layer prior to the filling with hollow balls.

This makes it possible to ensure easy demolding of the lightweight structural component or a smoother surface of a component of this type or a stronger bond between the hollow-ball packing and the outer cladding.

It is possible to use metal shells, metal or other hollow bodies as structures which forms the outer cladding and can be filled with the hollow balls according to the invention.

If a lightweight structural component is produced in a mold body, the surface of the demolded lightweight structural component is substantially formed by the shells of the outer hollow balls, the size of the shells of the hollow balls substantially determining the roughness of the surface. This surface may be laminated, coated or provided with coverings.

A demolded lightweight structural component can, as a semifinish lightweight structural component, be subjected to a further or final treatment. The semifinished lightweight structural component, which is easy to handle, can be sintered, resintered or infiltrated in order for the remaining cavities to be filled.

A preliminary product which has been prepared in this way may, for example, be used as a core in a mold of a plastics injection-molding machine and plastics can be injection-molded around it. As an alternative to the plastic, the outer cladding around a preliminary product of this type may also be formed from a metal or a metal alloy using a suitable process. This can be achieved, for example, by dipping into a melt or by build-up welding or using a metal-spraying process which is known per se.

A lightweight structural component or a semi-finished lightweight structural component may, if appropriate, be deformed by bending or pressing. However, it can also undergo material-removing machining. In these cases, however, a strong bond between the hollow balls should be ensured, which can be achieved, for example, with the aid of the functional-layer material which is able to withstand the deformation without the lightweight structural component breaking during the deformation.

For these cases, it is advantageously possible to use a functional-layer material which either cures in a number of stages or can be plastically deformed over a prolonged period using a known temperature range, so that the deformation of the lightweight structural component can be carried out after the treatment and before the complete curing which may take place.

The lightweight structural components may be produced in batches, for example in mold bodies, or continuously or quasi-continuously. The latter option is advantageous in particular for the production of semi-finished products.

The invention is to be explained in more detail below with reference to an exemplary embodiment. In the drawing:

FIG. 1 shows a section through a heatable mold body, in which a vibration damper formed from hollow balls can be produced as a lightweight structural component.

A vibration damper as lightweight structural component 1 as shown in FIG. 1 is substantially produced from hollow balls, the shells of which are formed from a sintered metal, for example iron. As is known in the prior art, they may have been produced in advance. In this example, the hollow balls used should have an external diameter of approx. 1 mm, and the diameters of all the hollow balls should be as uniform as possible.

The hollow balls can then be coated with a pulverulent copper alloy, for example by means of an appliance which is known from DE 197 50 042 C2. In the process, a functional layer with a thickness of approx. 0.3 mm is formed.

After the curing or drying of the functional layer, storage and any transport which may be required, the hollow balls, which are present in the form of a loose bed and has not stuck together, can be introduced into a split mold body 2. The mold body 2 is formed from a plurality of individual parts which have been joined together without leaving any gaps and after production of the vibration damper, once again as an example of a lightweight structural component, can be separated.

The mold body 2 also has a filling opening 4 and electrical heater elements 5. In order for the hollow balls which have been introduced to be compacted, the mold body 2 is in this example mounted on a vibratory device 6.

After the mold body 2 has been filled with the hollow balls through the filling opening 4, the vibratory device 6 is activated, so that the hollow balls are densely packed and fill all of the shaped features of the mold 2.

Following or in parallel with this, the heater elements are connected to an electric voltage source, and as a result the mold body 2, and consequently also the inner surface of the mold body 2, are heated. This leads to softening and, as the temperature is increased further, melting of the copper in the functional layer. The molten copper flows, and in the process surrounds the surface of the shells of the hollow balls and joins them together using the molten copper of adjacent hollow balls. After an imprecisely determined time and/or by means of a temperature control, the heater elements 5 are disconnected from the voltage source, and during the relatively rapid cooling of the mold body the temperature accordingly falls below the melting point of the copper, so that the latter solidifies.

The cooling may, for example, be accelerated by cooling air which is introduced into the mold body 2 passing through the porous lightweight structural component 1.

It is not absolutely imperative for all the copper of the functional layer to be melted. It may be sufficient for outer surface regions of the functional layers to be partially melted.

However, it may also be sufficient for the copper of hollow balls which are arranged in outer edge regions of the lightweight structural component 1 to be melted and for the hollow balls arranged in the interior to be left virtually unaffected, so that a type of external, relatively stable shell is formed on the lightweight structural component 1, which is sufficient to allow the lightweight structural component to be handled at least so that it can be removed from the mold body 2.

A lightweight structural component 1 of this type can then be subjected to a further heat treatment using a further method step in a sintering furnace, in order to completely melt all the copper.

In order for a lightweight structural component 1 to be used as a vibration damper, it is possible to select a particularly suitable copper alloy with sufficient stability and strength of the hollow balls which have been joined to one another.

What is claimed is:

1. A hollow ball comprising a sintered inorganic material shell and at least one unsintered functional layer on at least part of the sintered inorganic material shell,
   wherein the functional layer consists of a material which can flow and is plastically or elastically deformable as a result of physical or chemical treatment;
   said functional layer:
   a) being formed from an organic polymer solution,
   b) being formed from a binder suitable for adhesively binding particles together,
   c) comprising a blowing agent,
   d) comprising a metal which forms an intermetallic compound with the shell when the shell is metallic,
   e) consisting of an inorganic binder, or
   f) having a mass which is $\leq$ the mass of the shell.

2. The hollow ball as claimed in claim 1, wherein the shell is formed from a metal, a metal alloy, a metal oxide, a glass or a ceramic.

3. The hollow ball as claimed in claim 1, characterized in that the functional layer consists of a material or contains a material component whose softening point is less than the softening point of the shell material or the temperature at which the shell becomes unstable.

4. The hollow ball as claimed in claim 1, characterized in that the functional layer consists of a material or contains a material component whose melting point is less than the melting point of the shell material or the temperature at which the shell becomes unstable.

5. The hollow ball as claimed in claim 1, characterized in that the functional layer is formed from an organic polymer which can be dissolved using a solvent or contains such a polymer.

6. The hollow ball as claimed in claim 1, characterized in that the functional layer is formed from a polymer selected from ethylene vinyl acetate copolymers, polyamides, polyesters, epoxy resin, phenolic resin or rubber-based binders or contains such a polymer.

7. The hollow ball as claimed in claim 1, characterized in that the functional layer is formed from a binder and particles are held adhesively by the binder.

8. The hollow ball as claimed in claim 6, characterized in that the polymer is a powder coating based on epoxy resin.

9. The hollow ball as claimed in claim 1, characterized in that the functional layer contains or is formed from a metal, a metal oxide, a glass or a ceramic.

10. The hallow ball as claimed in claim 1, characterized in that a flux, sintering aid or a blowing agent is included in the functional layer.

11. The hollow ball as claimed in claim 1, characterized in that the functional layer consists of a metal which forms an intermetallic compound with metallic shell material or contains such a metal.

12. The hollow ball as claimed in claim 1, characterized in that the functional layer consists of an inorganic binder.

13. The hollow ball as claimed in claim 1, characterized in that the mass of die functional layer is $\leq$ the mass of the shell.

14. The hollow ball as claimed in claim 1, characterized in that the thickness of a functional layer is < the thickness of the shell.

15. The hollow ball as claimed in claim 14, characterized in that the thickness of a functional layer is $\leq 0.9$ times the thickness of the shell.

16. The hollow ball as claimed in claim 15, characterized in that the thickness of a functional layer is 0.1 to 0.5 times less than the thickness of the shell.

17. The hollow ball as claimed in claim 1, characterized in that the shell or the functional layer is formed from or contains a metal or metal alloy which can infiltrate the other material in each case.

18. The hollow ball as claimed in claim 1, characterized in that a sealing layer is formed on the functional layer.

19. A light weight structural component comprising hollow balls as claimed in claim 1.

20. The hollow ball as claimed in claim 2 wherein the shell is formed from a metal.

21. The hollow ball as claimed in claim 2 wherein the shell is formed from a metal alloy.

22. The hollow ball as claimed in claim 2 wherein the shell is formed from a metal oxide.

23. The hollow ball as claimed in claim 2 wherein the shell is formed from a ceramic.

24. A hollow ball comprising a sintered inorganic shell and at least one unsintered functional layer on at least part of the sintered inorganic shell, wherein the functional layer consists of a material which can flow and is plastically or elastically deformable as a result of physical or chemical treatment;

said functional layer:

a) containing at least one pulverulent metal and a blowing agent, b) containing a blowing agent which is a pulverulent metal hydride, pulverulent metal carbonate or pulverulent metal hydrate, c) having embedded therein ferromagnetic and/or permanent-magnet particles, or d) having thereon a sealing layer formed from cellulose, pectin or polyvinyl alcohol.

25. The hollow ball as claimed in claim 24, characterized in that ferromagnetic and/or permanent-magnet particles are embedded in the functional layer.

26. The hollow ball as claimed in claim 24, characterized in that the sealing layer is formed from cellulose, pectin or polyvinyl alcohol.

27. The hollow ball as claimed in claim 24, characterized in that the functional layer contains at least one pulverulent metal and a blowing agent.

28. The hollow ball as claimed in claim 24, wherein the functional layer contains a blowing agent which is a pulverulent metal hydride, carbonate or hydrate.

* * * * *